United States Patent
Forero Rueda

(10) Patent No.: US 12,365,270 B2
(45) Date of Patent: Jul. 22, 2025

(54) CHILD SEAT INSTALLATION WITH VEHICLE BELT CHECKING DEVICE

(71) Applicant: GM Global Technology Operations LLC, Detroit, MI (US)

(72) Inventor: Manuel Forero Rueda, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 18/359,551

(22) Filed: Jul. 26, 2023

(65) Prior Publication Data

US 2025/0033538 A1  Jan. 30, 2025

(51) Int. Cl.
 *G08B 21/00* (2006.01)
 *B60N 2/26* (2006.01)

(52) U.S. Cl.
 CPC .................. *B60N 2/268* (2023.08)

(58) Field of Classification Search
 CPC ...................................... B60N 2/268
 USPC ...................................... 340/457.1
 See application file for complete search history.

(56) References Cited

U.S. PATENT DOCUMENTS

| | | | |
|---|---|---|---|
| 6,749,260 B2 | 6/2004 | Abel | |
| 7,735,920 B2 | 6/2010 | Hinze et al. | |
| 8,089,369 B2 | 1/2012 | Stojanovic et al. | |
| 11,396,248 B2 | 7/2022 | Lau et al. | |
| 11,485,263 B2 | 11/2022 | Zhang | |
| 2002/0024205 A1* | 2/2002 | Curtis | B60R 22/12 280/733 |
| 2002/0043795 A1* | 4/2002 | Lichtinger | G01L 5/101 280/801.1 |
| 2005/0280297 A1 | 12/2005 | Patterson et al. | |
| 2014/0085070 A1* | 3/2014 | Schoenberg | B60N 2/268 340/457.1 |
| 2017/0129399 A1* | 5/2017 | Appukutty | B60K 35/00 |
| 2022/0128422 A1* | 4/2022 | Cech | B60Q 9/00 |

FOREIGN PATENT DOCUMENTS

| | | |
|---|---|---|
| DE | 202012007313 U1 | 11/2012 |
| DE | 102020124767 A1 | 4/2021 |
| DE | 102021111524 A1 | 5/2022 |
| DE | 112021004410 T2 | 7/2023 |

OTHER PUBLICATIONS

U.S. Appl. No. 18/347,070, filed Jul. 5, 2023.
U.S. Appl. No. 18/347,094, filed Jul. 5, 2023.

* cited by examiner

Primary Examiner — Mark S Rushing
(74) Attorney, Agent, or Firm — Vivacqua Crane, PLLC

(57) ABSTRACT

A measurement device for checking installation of a child seat on a vehicle seat includes a guide portion disposed along a vehicle seatbelt path across the child seat. The measurement device further includes a sensor portion disposed within the guide portion, and measuring a quantity of perpendicular compressive force applied by the seatbelt to the child seat, and an indicator in communication with the sensor portion. The indicator informs an operator of the quantity of perpendicular compressive force applied by the seatbelt to the child seat relative to a predetermined yield threshold.

19 Claims, 2 Drawing Sheets

CHILD SEAT INSTALLATION WITH VEHICLE BELT CHECKING DEVICE

INTRODUCTION

The present disclosure relates to children's car seats and how such car seats are secured within a vehicle. More specifically, this disclosure provides a device for measuring belt force in a belt holding a child's car seat onto a vehicle seat, thereby assuring that the child seat is securely fastened into the vehicle.

Child car seats are required by law in many jurisdictions, as they have been empirically shown to significantly increase the safety of children being transported in vehicles. A child's car seat is generally fabricated to incorporate belt receiver slots or other similar members for receiving a standard vehicle seatbelt therein, and thereby providing for the seatbelt to be used in securing the child's car seat in place on a vehicle seat. Upon installation of a typical child seat, commonly recommended methods to test whether the child seat has been properly installed include manually tugging or pulling on the child seat with the force of a "firm handshake" and if less than one inch of movement is achieved, then the child seat is properly secured. However, a method for measuring a required amount of seatbelt tension is not readily available to end users. Furthermore, even measuring seatbelt tension on the belt itself or on anchor points of the seatbelt do not necessarily ensure a snug and correct child seat installation. As a result, many children are still injured when the seatbelt holding the child's car seat in place has not been properly secured around the child's car seat or when the seatbelt is unintentionally loosened or left unfastened.

Accordingly, while current child's car seats and their securing mechanisms operate for their intended purpose when properly secured, there is a need for a new and improved system and method for checking the installation of children's car seats that ensures that the child's car seat is properly and securely attached to the vehicle seat by the seatbelt, without hindering the child car seat installation mechanism and procedure, while reducing child car seat installation complexity and confusion, and reducing the potential for unintentionally leaving the child's car seat unsecured or improperly secured within the vehicle.

SUMMARY

According to several aspects, a measurement device for checking installation of a child seat on a vehicle seat includes a guide portion disposed along a vehicle seatbelt path across the child seat. The measurement device further includes a sensor portion disposed within the guide portion, and measuring a quantity of perpendicular compressive force applied by the seatbelt to the child seat, and an indicator in communication with the sensor portion. The indicator informs an operator of the quantity of perpendicular compressive force applied by the seatbelt to the child seat relative to a predetermined yield threshold.

In another aspect of the present disclosure the guide portion further includes one or more of a channel, cradle, trough, depression, a complete or partially interrupted loop, a sleeve, or a set of arms shaped and sized to at least partially capture and movably retain the seatbelt within the guide portion.

In yet another aspect of the present disclosure the guide portion further includes one or more articulated arms, or latches shaped and sized to at least partially capture and movably retain the seatbelt within the guide portion.

In yet another aspect of the present disclosure the sensor portion further includes one or more of a mechanical, electromechanical, hydraulic, pneumatic, or electrical sensor capable of measuring a quantity of perpendicular compressive force applied by the seatbelt to the child seat.

In yet another aspect of the present disclosure the sensor portion further includes one or more of a mechanical, electrical, electromechanical, pneumatic, or hydraulic button at least partially depressible by the seatbelt.

In yet another aspect of the present disclosure the sensor portion further includes one or more of a load cell and a strain gauge.

In yet another aspect of the present disclosure the indicator further includes one or more of a visual, tactile, or audio indicator. Each of the visual, tactile, and audio indicators selectively provides the operator with a first indication when a quantity of compressive force applied to the child seat by the seatbelt is below the yield threshold. Each of the visual, tactile, and audio indicators selectively provides the operator with a second indication when a second quantity of compressive force applied to the child seat by the seatbelt is equal to or greater than the yield threshold.

In yet another aspect of the present disclosure the indicator includes one or more of a mechanical, digital, electronic, electromechanical, pneumatic or hydraulic indicator that generates one or more of a visual notification, a tactile notification, or an audio notification.

In yet another aspect of the present disclosure the predetermined yield threshold further includes a predetermined quantity of force in a direction perpendicular to a surface of the child seat that has been determined to be sufficient to properly secure the child seat to the vehicle seat.

In yet another aspect of the present disclosure the measurement device is disposed on or formed as a part of the child seat at one or more locations along the seatbelt path.

In yet another aspect of the present disclosure a system for checking installation of a child seat on a vehicle seat includes a vehicle seat, a child seat disposed on the vehicle seat, a vehicle seatbelt extending from the vehicle seat and at least partially capturing and securing the child seat to the vehicle seat, and a measurement device disposed on or formed as a part of the child seat. The measurement device includes a guide portion disposed at one or more positions along a vehicle seatbelt path across the child seat, a sensor portion disposed within the guide portion, and measuring a quantity of perpendicular compressive force applied by the seatbelt to the child seat, and an indicator in communication with the sensor portion. The indicator informs an operator of the quantity of perpendicular compressive force applied by the seatbelt to the child seat relative to a predetermined yield threshold.

In yet another aspect of the present disclosure the guide portion further includes one or more of a channel, a cradle, a trough, a depression, a complete or partially interrupted loop, a sleeve, or a set of arms shaped and sized to at least partially capture and movably retain the seatbelt within the guide portion.

In yet another aspect of the present disclosure the guide portion further includes one or more articulated arms, or latches shaped and sized to at least partially capture and movably retain the seatbelt within the guide portion.

In yet another aspect of the present disclosure the sensor portion further includes one or more of a mechanical, electromechanical, hydraulic, pneumatic, or electrical sensor capable of measuring a quantity of perpendicular compressive force applied by the seatbelt to the child seat.

In yet another aspect of the present disclosure the sensor portion further includes one or more of a mechanical, electrical, electromechanical, pneumatic, or hydraulic button at least partially depressible by the seatbelt, and/or one or more of a load cell and a strain gauge.

In yet another aspect of the present disclosure the indicator further includes one or more of a visual, tactile, or audio indicator. Each of the visual, tactile, and audio indicators selectively provides the operator with a first indication when a quantity of compressive force applied to the child seat by the seatbelt is below the yield threshold. Each of the visual, tactile, and audio indicators selectively provides the operator with a second indication when a second quantity of compressive force applied to the child seat by the seatbelt is equal to or greater than the yield threshold.

In yet another aspect of the present disclosure the indicator includes one or more of a mechanical, digital, electronic, electromechanical, pneumatic or hydraulic indicator that generates one or more of a visual notification, a tactile notification, or an audio notification.

In yet another aspect of the present disclosure the predetermined yield threshold further includes a predetermined quantity of force in a direction perpendicular to a surface of the child seat that has been determined to be sufficient to properly secure the child seat to the vehicle seat.

In yet another aspect of the present disclosure the system further includes a control module having a processor, a memory, and one or more input/output (I/O) ports, the I/O ports in communication with the measurement device and in communication with one or more of a human-machine-interface (HMI) in a vehicle and an operator's handheld device, the memory storing programmatic control logic, the processor executing the programmatic control logic. The programmatic control logic includes a first control for measuring, with the measurement device, a quantity of force being applied by the seatbelt to the child seat. The programmatic control logic includes a second control logic that receives, within the control module via the I/O ports 48 the measured quantity of force. The programmatic control logic further includes a third control logic compares the measured quantity of force to the yield threshold, and a fourth control logic that transmits, via the I/O ports, results of the comparison of the measured force "F" relative to the yield threshold to one or more of the HMI and the operator's handheld device. The programmatic control logic further includes a fifth control logic displays the results of the comparison on one or more of the HMI and the operator's handheld device.

In yet another aspect of the present disclosure a system for checking installation of a child seat on a vehicle seat includes a vehicle seat, a child seat disposed on the vehicle seat, a vehicle seatbelt extending from the vehicle seat and at least partially capturing and securing the child seat to the vehicle seat, and a measurement device disposed on or formed as a part of the child seat. The measurement device includes a guide portion disposed at one or more positions along a vehicle seatbelt path across the child seat. The guide portion further includes one or more of a channel, a cradle, a trough, a depression, a complete or partially interrupted loop, a sleeve, or a set of arms shaped and sized to at least partially capture and movably retain the seatbelt within the guide portion, or one or more articulated arms, or latches shaped and sized to at least partially capture and movably retain the seatbelt within the guide portion. A sensor portion disposed within the guide portion measures a quantity of perpendicular compressive force applied by the seatbelt to the child seat. The sensor portion further includes one or more of a mechanical, electromechanical, hydraulic, pneumatic, or electrical sensor, button, strain gauge or load cell capable of measuring a quantity of perpendicular compressive force applied by the seatbelt to the child seat. The system further includes an indicator in communication with the sensor portion. The indicator is one or more of a visual, tactile, or audio indicator. The visual, tactile, or audio indicator selectively provides an operator with a first indication when a quantity of compressive force applied to the child seat by the seatbelt is below a predetermined yield threshold. The visual, tactile, or audio indicator also selectively provides the operator with a second indication when a second quantity of compressive force applied to the child seat by the seatbelt is equal to or greater than the yield threshold. The indicator generates one or more of a visual notification, a tactile notification, or an audio notification that informs an operator of the quantity of perpendicular compressive force applied by the seatbelt to the child seat relative to a predetermined yield threshold. The predetermined yield threshold is a predetermined quantity of force in a direction perpendicular to a surface of the child seat that has been determined to be sufficient to properly secure the child seat to the vehicle seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
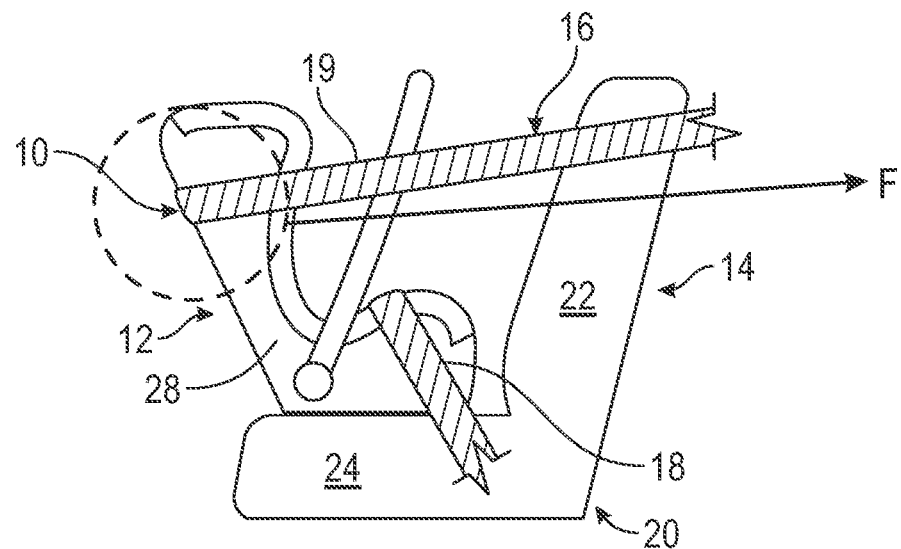
FIG. 1 is a perspective side view of a child seat installation on a vehicle seat with a vehicle belt checking device according to an exemplary embodiment.
Figure 2:
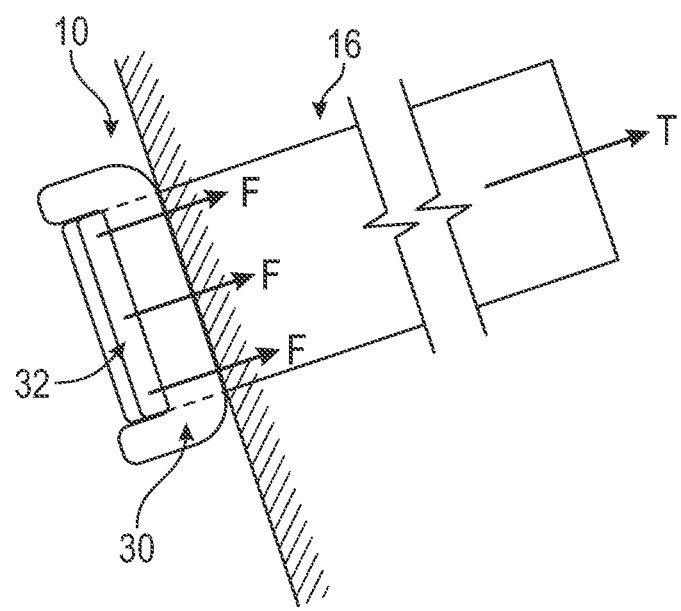
FIG. 2 is a perspective side detail view of the vehicle belt checking device of FIG. 1 according to an exemplary embodiment.
Figure 3:
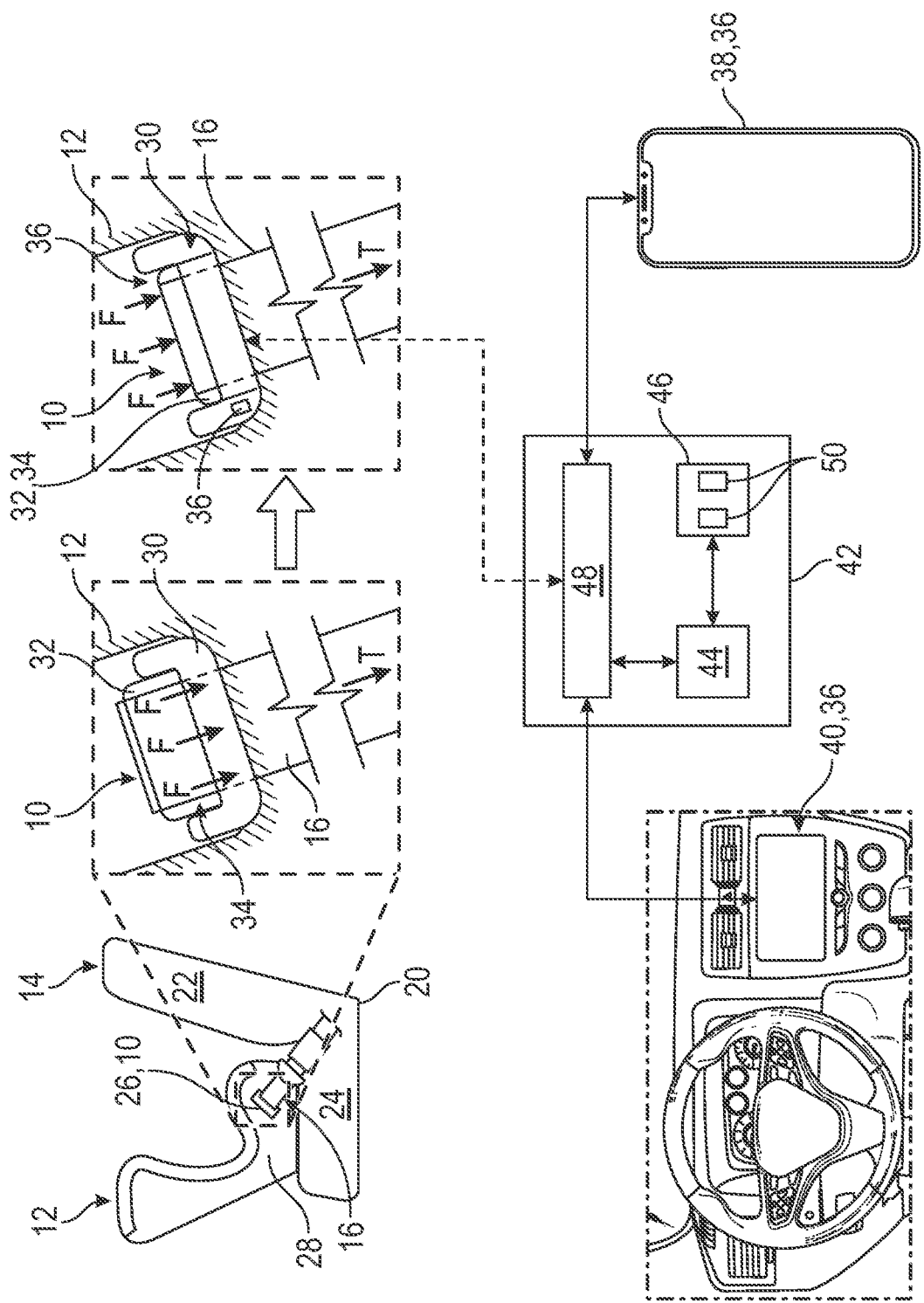
FIG. 3 is a perspective side view of the child seat installation on a vehicle seat with a vehicle belt checking device and depicting two different states of compression of a sensor portion of the vehicle belt checking device according to an exemplary embodiment.

Referring to FIGS. 1, 2, and 3, a measurement device 10 for checking the installation of a child seat 12 to a vehicle seat 14 is shown. In several aspects, the measurement device 10 operates to detect the force of a seatbelt 16 affixing the child seat 12 to the vehicle seat 14. The child seat 12 may be any of a wide variety of different types of child seat 12 without departing from the scope or intent of the present disclosure. In some examples, the child seat 12 may be a rear-facing car seat, a forward-facing car seat, convertible seat, an all-in-one seat, a booster seat, or the like without departing from the scope or intent of the present disclosure. Further, while the vehicle seat 14 shown is generally formed as a bench seat, other conformations of seats are intended to be within the scope of the present disclosure. For example, the vehicle seat 14 may also be a bench seat, a bucket seat, a captain's chair, a sports seat, a rumble seat or the like without departing from the scope or intent of the present disclosure.

The seatbelt 16, as will be generally understood, is operable to secure a vehicle occupant to the vehicle seat 14, and may similarly be used to secure the child seat 12 to the vehicle seat 14. In several aspects, the seatbelt 16 includes at least a lap strap 18 that extends from a point proximate a juncture 20 of the backrest 22 and squab 24 of the vehicle seat 14. The lap strap 18 extends laterally across the vehicle seat 14 to a seatbelt tongue (not specifically shown), and the tongue is secured by a seatbelt buckle or anchor (not specifically shown) that is secured to the squab 24 or to the structure of the vehicle proximate the squab 24. A tension reel, retractor, or other such similar spring-loaded, or ratcheting reel automatically provides a predefined amount of tension to the lap strap 18 when the lap strap 18 is secured by the seatbelt buckle. The tension reel and the seatbelt buckle are separated by a lateral distance approximately the width of an average adult human's hips. It should be appreciated that while the seatbelt 16 has been generally described as including a lap strap 18, additional straps may be joined to or extend from the seatbelt buckle. In some specific examples, the additional straps may include one or more shoulder straps, a shoulder harness, or other such multi-point harnesses or belts without departing from the scope or intent of the present disclosure.

In several aspects, the child seat 12 is secured to the vehicle seat at least by the lap strap 18. However the child seat 12 may have additional attachment points through which the shoulder strap 19, or other straps of the seatbelt 16 may extend, thereby securing the child seat 12 to the vehicle seat 14. The seatbelt 16 extends through an orifice 26 formed through a structural component of the child seat 12. In the specific, but non-limiting example shown in FIG. 3, the lap strap 18 of the seatbelt 16 extends through the orifice 26 formed in a structural side wall 28 of the child seat 12. It should be appreciated that while only one side of the child seat 12 is shown in FIG. 1, that there is a matching orifice 26 formed through the opposite side wall (not specifically shown) of the child seat 12 through which the lap strap 18 extends and eventually is secured by attachment to the seatbelt buckle or anchor.

In order to fully and properly secure the child seat 12 to the vehicle seat 14, an installer, human or otherwise, threads the seatbelt 16 through the orifices 26 of the child seat 12 and affixes the tongue of the seatbelt 16 to the seatbelt buckle or anchor. The installer then applies a tension to the seatbelt 16, and locks the seatbelt 16 around the child seat. In several aspects, the quantity of tension in the seatbelt 16, when applied by the installer, is substantially higher than the predefined amount of tension in the lap strap 18 when the ratcheting reel is operating on its own. As tension is increasingly applied to the seatbelt 16, the child seat 12 is more and more tightly held against the vehicle seat 14, as the tension of the seatbelt 16 is applied towards the juncture 20 of the backrest 22 and squab 24 of the vehicle seat 14. In several aspects, the force "F" is perpendicular to the surface of the child seat 12 over which the seatbelt 16 passes. However, if an excess of force "F" is applied, the orifices 26 of the child seat 12 may suffer mechanical fatigue, or the child seat 12 may be positioned in a way that is less protective of children who may be secured within the child seat 12.

The measurement device 10, shown more specifically in FIGS. 2 and 3, is used to ensure that an appropriate amount of force has been applied to the child seat 12 by the seatbelt 16 in securing the child seat 12 to the vehicle seat 14. The measurement device 10 may be located in any of a variety of locations on the child seat 12, and may be incorporated directly into the structure of the child seat 12, manufactured as a part of the child seat 12, or attached to or otherwise mounted to the child seat 12. However, it should be appreciated that the measurement device 10 is located on the child seat 12 at a location along the seatbelt 16 path, and in a position that allows the measurement device 10 to accurately assess the amount of perpendicular force "F" being applied by the seatbelt 16 to the child seat 12. In some aspects, the measurement device 10 operates as a seatbelt 16 routing guide or portion thereof.

The measurement device 10 includes a belt guide 30 and a sensor portion 32. The belt guide 30 may take any of a variety of different forms, including but not limited to a channel, a cradle, a trough, a depression, a complete or partially interrupted loop, a sleeve, one or more arms shaped and sized to capture and movably retain the seatbelt 16 therein, or the like without departing from the scope or intent of the present disclosure. The belt guide 30 is sized and shaped to receive and at least partially retain the seatbelt 16 within the belt guide 30. In some aspects, the belt guide 30 may be substantially passive, i.e. a channel or the like, or may include components that are activated by an installer or operator to capture and retain the seatbelt 16 within the belt guide 30. For example, the belt guide 30 may include one or more articulated arms, latches, or the like shaped and sized to allow an installer or operator to capture and movably retain the seatbelt 16 therein.

As the seatbelt 16 is tensioned or tightened "T" by an operator, when the seatbelt 16 is properly located within the belt guide 30, the sensor portion 32 is in contact with the seatbelt 16 and detects a perpendicular force "F" applied by the seatbelt 16 to the child seat 12. The sensor portion 32 may be any of a variety of mechanical, electromechanical, hydraulic and/or pneumatic devices capable of detecting the force "F", which is a compressive force compressing the child seat 12 against the vehicle seat 14. In some examples, the sensor portion 32 may be a mechanical, electrical, electromechanical, pneumatic, hydraulic or other type of button 34, mechanical spring, or other such depressible component. In other examples, the sensor portion 32 may be a component without moving parts, such as a load cell, a strain gauge, or the like. In further examples, the sensor portion 32 includes a predetermined yield threshold whereupon when a predetermined amount of measured perpendicular or compressive force "F" is applied by the seatbelt 16 to the sensor portion 32, the yield threshold is achieved. Upon reaching the yield threshold, the sensor portion 32 provides a notification to the operator that the child seat 12 is properly secured in place against the vehicle seat 14 by the seatbelt 16. In several aspects, the term "properly secured" is intended to mean that the quantity of movement of the child seat 12 relative to the vehicle seat 14 is less than a predetermined amount of movement when the yield threshold has been achieved. In some examples, the predetermined amount of movement is less than one inch of longitudinal or lateral movement of the child seat 12 relative to the vehicle seat 14.

In several aspects, the measurement device 10 further includes an indicator 36. The indicator 36 notifies the operator of the amount of perpendicular or compressive force "F" being applied to the sensor portion 32 by the seatbelt 16 relative to the yield threshold. In some aspects, the indicator 36 operates as a pass/fail indicator that notifies the operator of the amount of perpendicular or compressive force "F" being applied by the seatbelt 16 to the child seat 12. The indicator 36 may be any of a variety of different types of indicator 36, including but not limited to visual, tactile, or audio indicators 36 or combinations thereof. A visual indicator 36 may thus be a light such as a light-emitting-diode (LED), an incandescent bulb, or the like, or may be a purely mechanical visual indicator 36, such as a mechanically-shifting color wheel having at least two colors, one or more flip cards, or the like.

In some examples, the indicator 36 or indicators 36 may be mechanical, digital, electronic, pneumatic, hydraulic, or combinations thereof. In further examples, the indicator 36 may continuously and/or periodically send a wired or wireless signal containing information about the amount of perpendicular or compressive force "F" being applied to the sensor portion 32 by the seatbelt 16 to an operator's handheld device 38, an in-vehicle human-machine-interface (HMI) 40, or the like. In examples where wireless communication occurs, the measurement device 10 communicates with a control module 42, and the control module 42 executes control logic that causes a notification to be sent to one or more of the HMI 40 or operator's handheld device 38 to show the operator whether or not the child seat 12 has been properly secured.

The control module 42 is a non-generalized, electronic control having a preprogrammed digital computer or processor 44, non-transitory computer readable medium or memory 46 used to store data such as control logic, software applications, instructions, computer code, data, lookup tables, etc., and input/output (I/O) ports 48. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 46 excludes wired, wireless, optical, or other communication links that transport transitory electrical or other signals. A non-transitory computer readable medium or memory 46 includes media where data can be permanently stored and media where data can be stored and later overwritten, such as a rewritable optical disc or an erasable memory device. Computer code includes any type of program code, including source code, object code, and executable code. The processor 44 is configured to execute the code or instructions. The control module 42 may be a dedicated Wi-Fi controller, an infotainment control module, or the like. The I/O ports 48 are configured to communicate in a wired or wireless fashion using Wi-Fi protocols under IEEE 802.11x.

The control module 42 further includes one or more applications 50. An application 50 is a software program configured to perform a specific function or set of functions. The application 50 may include one or more computer programs, software components, sets of instructions, procedures, functions, objects, classes, instances, related data, or a portion thereof adapted for implementation in a suitable computer readable program code. The applications 50 may be stored within the memory 46 or in additional or separate memory 46. Examples of the applications 50 include audio or video streaming services, games, browsers, social media, and applications 50 for informing vehicle operators or child seat 12 installers of the secured or unsecured status of the child seat 12.

In some examples, an application 50 for determining the secured or unsecured status of the child seat 12 includes at least a first control logic for measuring, with the measurement device 10, a quantity of force being applied by the seatbelt 16 to the child seat 12. A second control logic receives, within the control module 42 via the I/O ports 48 the measured quantity of force, and a third control logic compares the measured quantity of force to the yield threshold. A fourth control logic transmits, via the I/O ports 48, results of the comparison of the measured force "F" relative to the yield threshold to the HMI 40 and/or the operator's handheld device 38. A fifth control logic then displays the results of the comparison on the HMI 40 and/or the operator's handheld device 38. The control logic may be executed periodically, continuously, or only upon an operator request without departing from the scope or intent of the present disclosure.

In additional examples, the indicator 36 may be integrated into the child seat 12. The indicator 36 may provide perpendicular force "F" measurement information to the operator through color-coded displays, such as a red indicator 36 reading to show that the amount of perpendicular force "F" being applied is below the yield threshold or a green indicator 36 reading showing that the amount of perpendicular force "F" is at or above the yield threshold, or the like. Audible indications, such as a click, chime, or other such positive indicator 36 audible indication may be used to indicate that the amount of perpendicular force "F" is at or above the yield threshold, while a negative audible indication, such as a buzzer, or the like may be used to indicate that the amount of perpendicular force "F" is below the yield threshold. In electromechanical variants, the sensor portion 32 may include a mechanical button 34 that, upon application of sufficient compressive perpendicular force "F", contacts an electrical trigger that causes the indicator 36 to inform the operator of the amount of perpendicular force "F" that has been applied.

It should be appreciated that while in the foregoing, the measurement device 10 has been described in use in concert with a vehicle seat 14 and a child seat 12, that the measurement device 10 may be used in other areas, such as within a cargo compartment of a vehicle to monitor, measure, and indicate an amount of force being applied to cargo strapped into the cargo compartment by belts or straps to retain the cargo compartment within the cargo compartment. Further, it should be appreciated that the measurement device 10 has been described herein as having a sensor portion 32 that measures perpendicular force "F" relative to a yield threshold, where the yield threshold effectively defines a minimum allowable amount of perpendicular force "F", that the sensor portion 32 may likewise measure a maximum allowable amount of perpendicular force "F". In some examples, the sensor portion 32 may measure both a minimum and maximum amount of allowable perpendicular force "F". In some examples, the maximum amount of allowable perpendicular force "F" defines a quantity of perpendicular force "F" at or above which, the child seat 12 or cargo may be in some way negatively impacted, such as by structural deformation, a shift in position that could impact cargo integrity, child seat 12 occupant comfort or cause a departure in child seat 12 position relative to the vehicle seat 14 that reduces the efficacy of the child seat 12 in protecting child seat 12 occupants.

A measurement device 10 for checking the installation of a child seat 12 onto a vehicle seat 14 of the present disclosure offers several advantages. These include the ability to quickly, easily, effectively, and correctly install a child seat 12 or a child seat 12 base portion (in child seat 12 variants with a separable base portion) to a vehicle seat 14 and gauging the compression force "F" applied by the seatbelt 16 to the child seat 12 or base portion thereof. Further advantages include decreasing the quantity of false positive indications that may occur if using seatbelt 16 tension to determine whether the child seat 12 has been properly installed on the vehicle seat 14. Additionally, since the measurement device 10 may be integrated into the child seat 12 or added as an accessory component, operators are able to ensure proper child seat 12 installation, especially in instances where the child seat 12 is being installed temporarily in a ride share, taxi, public transport vehicle, or the like. Further, because the measurement device 10 may be integrated directly into or added as an accessory, the complexity of the child seat 12 may be reduced.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A measurement device for checking installation of a child seat on a vehicle seat, the device comprising:
   a guide portion disposed along a vehicle seatbelt path across the child seat;
   a sensor portion disposed within the guide portion, and measuring a quantity of perpendicular compressive force applied by the seatbelt to the child seat; and
   an indicator in communication with the sensor portion, wherein the indicator informs an operator of the quantity of perpendicular compressive force applied by the seatbelt to the child seat relative to a predetermined yield threshold, wherein the predetermined yield threshold further comprises:
   a maximum allowable quantity of perpendicular force "F" at or above which the child seat compromised by one or more of: structural deformation, a shift in position that reduces efficacy of the child seat, and a shift in child seat position that affects child seat occupant comfort; and
   a minimum allowable quantity of perpendicular force "F", below which the child seat is not properly secured to the vehicle seat such that upon meeting or exceeding the minimum allowable quantity of perpendicular force "F", a quantity of movement of the child seat relative to the vehicle seat is less than a predetermined amount of movement and the child seat is properly secured to the vehicle seat as long as the maximum allowable quantity of perpendicular force "F" has not been achieved; and
   wherein the measurement device is formed as a part of the child seat at one or more locations along the vehicle seatbelt path.

2. The device of claim 1, wherein the guide portion further comprises:
   one or more of a channel, cradle, trough, depression, a complete or partially interrupted loop, a sleeve, or a set of arms shaped and sized to at least partially capture and movably retain the seatbelt within the guide portion.

3. The device of claim 1, wherein the guide portion further comprises:
   one or more articulated arms, or latches shaped and sized to at least partially capture and movably retain the seatbelt within the guide portion.

4. The device of claim 1, wherein the sensor portion further comprises:
   one or more of a mechanical, electromechanical, hydraulic, pneumatic, or electrical sensor capable of measuring a quantity of perpendicular compressive force applied by the seatbelt to the child seat.

5. The device of claim 4, wherein the sensor portion further comprises:
   one or more of a mechanical, electrical, electromechanical, pneumatic, or hydraulic button at least partially depressible by the seatbelt.

6. The device of claim 4, wherein the sensor portion further comprises:
   one or more of a load cell and a strain gauge.

7. The device of claim 1, wherein the indicator further comprises:
   one or more of a visual, tactile, or audio indicator, wherein each of the visual, tactile, and audio indicators selectively provides the operator with a first indication when a quantity of compressive force applied to the child seat by the seatbelt is below the yield threshold; and
   each of the visual, tactile, and audio indicators selectively provides the operator with a second indication when a second quantity of compressive force applied to the child seat by the seatbelt is equal to or greater than the yield threshold.

8. The device of claim 7, wherein the indicator comprises:
   one or more of a mechanical, digital, electronic, electromechanical, pneumatic or hydraulic indicator that generates one or more of a visual notification, a tactile notification, or an audio notification.

9. The device of claim 7, wherein the predetermined yield threshold further comprises:
   a predetermined quantity of force in a direction perpendicular to a surface of the child seat that has been determined to be sufficient to properly secure the child seat to the vehicle seat.

10. A system for checking installation of a child seat on a vehicle seat, the system comprising:
    a vehicle seat;
    a child seat disposed on the vehicle seat;
    a vehicle seatbelt extending from the vehicle seat and at least partially capturing and securing the child seat to the vehicle seat;
    a measurement device formed as a part of the child seat, the measurement device having:
    a guide portion disposed at one or more positions along a vehicle seatbelt path across the child seat;
    a sensor portion disposed within the guide portion, and measuring a quantity of perpendicular compressive force applied by the seatbelt to the child seat; and
    an indicator in communication with the sensor portion, wherein the indicator informs an operator of the quantity of perpendicular compressive force applied by the seatbelt to the child seat relative to a predetermined yield threshold, wherein the predetermined yield threshold further comprises:
    a maximum allowable quantity of perpendicular force "F" at or above which the child seat compromised by one or more of: structural deformation, a shift in position that reduces efficacy of the child seat, and a shift in child seat position that affects child seat occupant comfort; and
    a minimum allowable quantity of perpendicular force "F", below which the child seat is not properly secured to the vehicle seat such that upon meeting or exceeding the minimum allowable quantity of perpendicular force "F", a quantity of movement of the child seat relative to the vehicle seat is less than a predetermined amount of movement and the child seat is properly secured to the vehicle seat as long as the maximum allowable quantity of perpendicular force "F" has not been achieved; and wherein the measurement device is formed as a part of the child seat at one or more locations along the vehicle seatbelt path.

11. The system of claim 10, wherein the guide portion further comprises:

one or more of a channel, a cradle, a trough, a depression, a complete or partially interrupted loop, a sleeve, or a set of arms shaped and sized to at least partially capture and movably retain the seatbelt within the guide portion.

12. The system of claim 10, wherein the guide portion further comprises:

one or more articulated arms, or latches shaped and sized to at least partially capture and movably retain the seatbelt within the guide portion.

13. The system of claim 10, wherein the sensor portion further comprises:

one or more of a mechanical, electromechanical, hydraulic, pneumatic, or electrical sensor capable of measuring a quantity of perpendicular compressive force applied by the seatbelt to the child seat.

14. The system of claim 13, wherein the sensor portion further comprises:

one or more of a mechanical, electrical, electromechanical, pneumatic, or hydraulic button at least partially depressible by the seatbelt; or one or more of a load cell and a strain gauge.

15. The system of claim 10, wherein the indicator further comprises:

one or more of a visual, tactile, or audio indicator, wherein each of the visual, tactile, and audio indicators selectively provides the operator with a first indication when a quantity of compressive force applied to the child seat by the seatbelt is below the yield threshold; and each of the visual, tactile, and audio indicators selectively provides the operator with a second indication when a second quantity of compressive force applied to the child seat by the seatbelt is equal to or greater than the yield threshold.

16. The system of claim 15, wherein the indicator comprises:

one or more of a mechanical, digital, electronic, electromechanical, pneumatic or hydraulic indicator that generates one or more of a visual notification, a tactile notification, or an audio notification.

17. The system of claim 15, wherein the predetermined yield threshold further comprises:

a predetermined quantity of force in a direction perpendicular to a surface of the child seat that has been determined to be sufficient to properly secure the child seat to the vehicle seat.

18. The system of claim 15 further comprising:

a control module having a processor, a memory, and one or more input/output (I/O) ports, the I/O ports in communication with the measurement device and in communication with one or more of a human-machine-interface (HMI) in a vehicle and an operator's handheld device, the memory storing programmatic control logic, the processor executing the programmatic control logic, the programmatic control logic including:

a first control for measuring, with the measurement device, a quantity of force being applied by the seatbelt to the child seat;

a second control logic that receives, within the control module via the I/O ports, the measured quantity of force;

a third control logic compares the measured quantity of force to the yield threshold;

a fourth control logic transmits, via the I/O ports, results of the comparison of the measured force "F" relative to the yield threshold to one or more of the HMI and the operator's handheld device; and a fifth control logic displays the results of the comparison on one or more of the HMI and the operator's handheld device.

19. A system for checking installation of a child seat on a vehicle seat, the system comprising:

a vehicle seat;

a child seat disposed on the vehicle seat;

a vehicle seatbelt extending from the vehicle seat and at least partially capturing and securing the child seat to the vehicle seat;

a measurement device formed as a part of the child seat, the measurement device having:

a guide portion disposed at one or more positions along a vehicle seatbelt path across the child seat, wherein the guide portion further includes one or more of a channel, a cradle, a trough, a depression, a complete or partially interrupted loop, a sleeve, or a set of arms shaped and sized to at least partially capture and movably retain the seatbelt within the guide portion; or one or more articulated arms, or latches shaped and sized to at least partially capture and movably retain the seatbelt within the guide portion;

a sensor portion disposed within the guide portion, and measuring a quantity of perpendicular compressive force applied by the seatbelt to the child seat wherein the sensor portion further includes one or more of a mechanical, electromechanical, hydraulic, pneumatic, or electrical sensor, button, strain gauge or load cell capable of measuring a quantity of perpendicular compressive force applied by the seatbelt to the child seat; and an indicator in communication with the sensor portion, wherein the indicator is one or more of a visual, tactile, or audio indicator, wherein the visual, tactile, or audio indicator selectively provides an operator with a first indication when a quantity of compressive force applied to the child seat by the seatbelt is below a predetermined yield threshold;

the visual, tactile, or audio indicator selectively provides the operator with a second indication when a second quantity of compressive force applied to the child seat by the seatbelt is equal to or greater than the yield threshold; and wherein the indicator generates one or more of a visual notification, a tactile notification, or an audio notification that informs an operator of the quantity of perpendicular compressive force applied by the seatbelt to the child seat relative to a predetermined yield threshold, wherein the predetermined yield threshold is a predetermined quantity of force in a direction perpendicular to a surface of the child seat that has been determined to be sufficient to properly secure the child seat to the vehicle seat, wherein the predetermined yield threshold further comprises:

a maximum allowable quantity of perpendicular force "F" at or above which the child seat compromised by one or more of: structural deformation, a shift in position that reduces efficacy of the child seat, and a shift in child seat position that affects child seat occupant comfort; and a minimum allowable quantity of perpendicular force "F", below which the child seat is not properly secured to the vehicle seat such that upon meeting or exceeding the minimum allowable quantity of perpendicular force "F", a quantity of movement of the child seat relative to the vehicle seat is less than a predetermined amount of movement and the child seat is properly secured to the vehicle seat as long as the maximum allowable quantity of perpendicular force "F" has not been achieved; and wherein the measurement device is formed as a part of the child seat at one or more locations along the vehicle seatbelt path.

\* \* \* \* \*